(12) United States Patent
Young et al.

(10) Patent No.: US 8,584,112 B2
(45) Date of Patent: Nov. 12, 2013

(54) OPEN APPLICATION LIFECYCLE MANAGEMENT FRAMEWORK

(75) Inventors: Charles C. Young, Austin, TX (US); Shashi Kumar Velur, Austin, TX (US); Raymond Chase, Austin, TX (US); Randal Lee Guck, Dana Point, CA (US); Ernst Ambichl, Altenberg (AT); Ronald D. Sauers, Mebane, NC (US); Richard Charles Gronback, Westbrook, CT (US)

(73) Assignee: Borland Software Corporation, Austin, TX (US)

( * ) Notice: Subject to any disclaimer, the term of this patent is extended or adjusted under 35 U.S.C. 154(b) by 1097 days.

(21) Appl. No.: 12/503,052

(22) Filed: Jul. 14, 2009

(65) Prior Publication Data

US 2010/0017792 A1    Jan. 21, 2010

Related U.S. Application Data

(60) Provisional application No. 61/080,462, filed on Jul. 14, 2008.

(51) Int. Cl.
  *G06F 9/45* (2006.01)
(52) U.S. Cl.
  USPC .......................................................... 717/162
(58) Field of Classification Search
  USPC .......................................................... 717/162
  See application file for complete search history.

(56) References Cited

U.S. PATENT DOCUMENTS

| | | | |
|---|---|---|---|
| 8,132,153 B2 * | 3/2012 | Subramanyam | 717/121 |
| 2006/0015381 A1 * | 1/2006 | Flinn et al. | 705/7 |
| 2006/0021018 A1 * | 1/2006 | Hinton et al. | 726/10 |

OTHER PUBLICATIONS

Nezhad et al., Semi-Automated Adaptation of Service Interactions, May 8, 2007, ACM, pp. 993-1002.*

* cited by examiner

*Primary Examiner* — John Chavis
(74) *Attorney, Agent, or Firm* — DLA Piper LLP US

(57) ABSTRACT

Techniques for open application lifecycle management frameworks are described, including using a framework hosted on one or more computers and having one or more services to integrate the one or more services with one or more applications using one or more providers, each of the one or more providers is adapted to at least one of the one or more applications, registering one or more repositories associated with the one or more applications using a location service module, receiving an input creating a project context associated with a project, data associated with the input being stored in a data structure associated with the project, the data structure being stored in a repository associated with the framework, generating a link, after registering the one or more repositories, between one or more element containers associated with the project, the link and the one or more element containers being stored in the repository, and configuring the framework to detect another input indicating interaction with an artifact, other data associated with the interaction being mapped between the one or more repositories and the repository using a domain model.

20 Claims, 10 Drawing Sheets

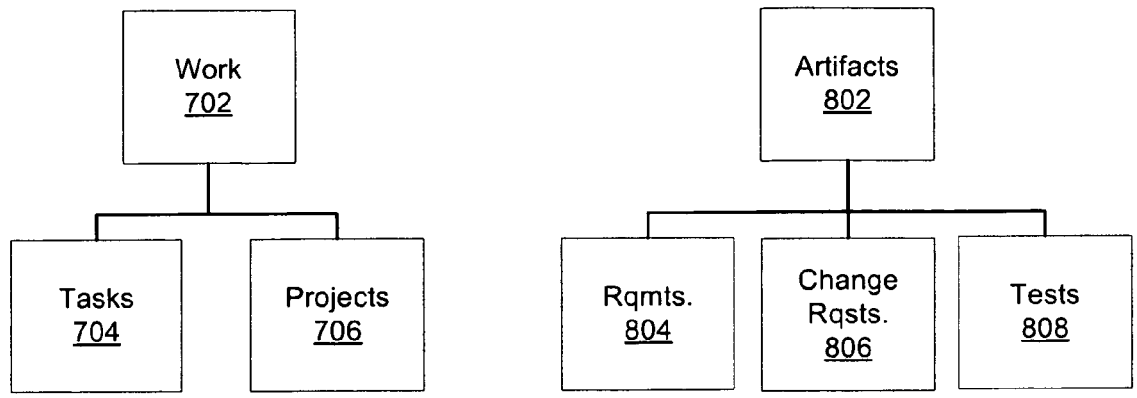
FIG. 7
FIG. 8
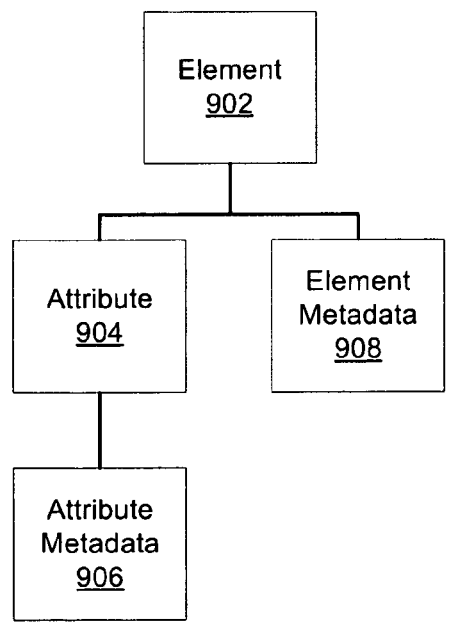
FIG. 9

OPEN APPLICATION LIFECYCLE MANAGEMENT FRAMEWORK

CROSS REFERENCE TO RELATED APPLICATION

This application is a U.S. non-provisional patent application that claims the benefit of U.S. Provisional Patent Application No. 61/080,462, filed Jul. 14, 2008, entitled "METHODS AND SYSTEMS FOR COLLECTING AND NORMALIZING METRICS FROM MULTIPLE PROJECTS OR PROCESSES," which is herein incorporated by reference for all purposes.

FIELD

The present invention relates generally to computer software, computer program architecture, and software development techniques and applications. More specifically, techniques for an open application lifecycle management framework are described.

BACKGROUND

Conventional software development is traditionally performed using solutions that rely upon the development of functional requirements or specifications (hereafter "requirements") in order to identify features or functions that should be built or developed into a computer program or application. Typically, disparate computer software, programs, or applications (hereafter "applications") are often used in conventional techniques to provide different types of features or functions, such as requirements definition, change management, quality control, analysis, business intelligence, or reporting. Given the different types of solutions used, which are typically developed by different organizations or companies, the ability to use cross-product data is limited and often restrictive.

Companies, business, or organizations, large and small, often must rely upon the use of third party applications and development tools in order to build complex software projects. Often a single vendor or provider does not offer all of the tools that are required for a given project. However, when used together, different vendor applications may require extensive integration, development of custom source code in order to integrate applications together using software development kits, application programming interfaces (hereafter "APIs"), or other techniques. Further, data transferred between these applications often requires frequent development of source code in order for data to be used between different products and platforms. The use of proprietary formats to describe common data elements in different products discourages integration, raises project development times, increases project development costs, and is labor-intensive.

Thus, what is needed is a solution for enabling cross-product data sharing, analysis, and reporting for software development applications without the limitations of conventional techniques.

BRIEF DESCRIPTION OF THE DRAWINGS

Various embodiments or examples ("examples") are disclosed in the following detailed description and the accompanying drawings:

FIG. 7 illustrates exemplary work types used in an open application lifecycle management framework and domain model;

FIG. 8 illustrates exemplary artifacts used in an open application lifecycle management framework and domain model;

FIG. 9 illustrates exemplary elements used in an open application lifecycle management framework and domain model;

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™), ActionScript™, FleX™, Lingo™, Java™, Javascript™, Ajax, Perl, COBOL, Fortran, ADA, XML, MXML, HTML, DHTML, XHTML, HTTP, XMPP, PHP, and others. Design, publishing, and other types of applications such as Dreamweaver®, Shockwave®, Flash®, Drupal and Fireworks® may also be used to implement the described techniques. The described techniques may be varied and are not limited to the examples or descriptions provided.

Figure 1:
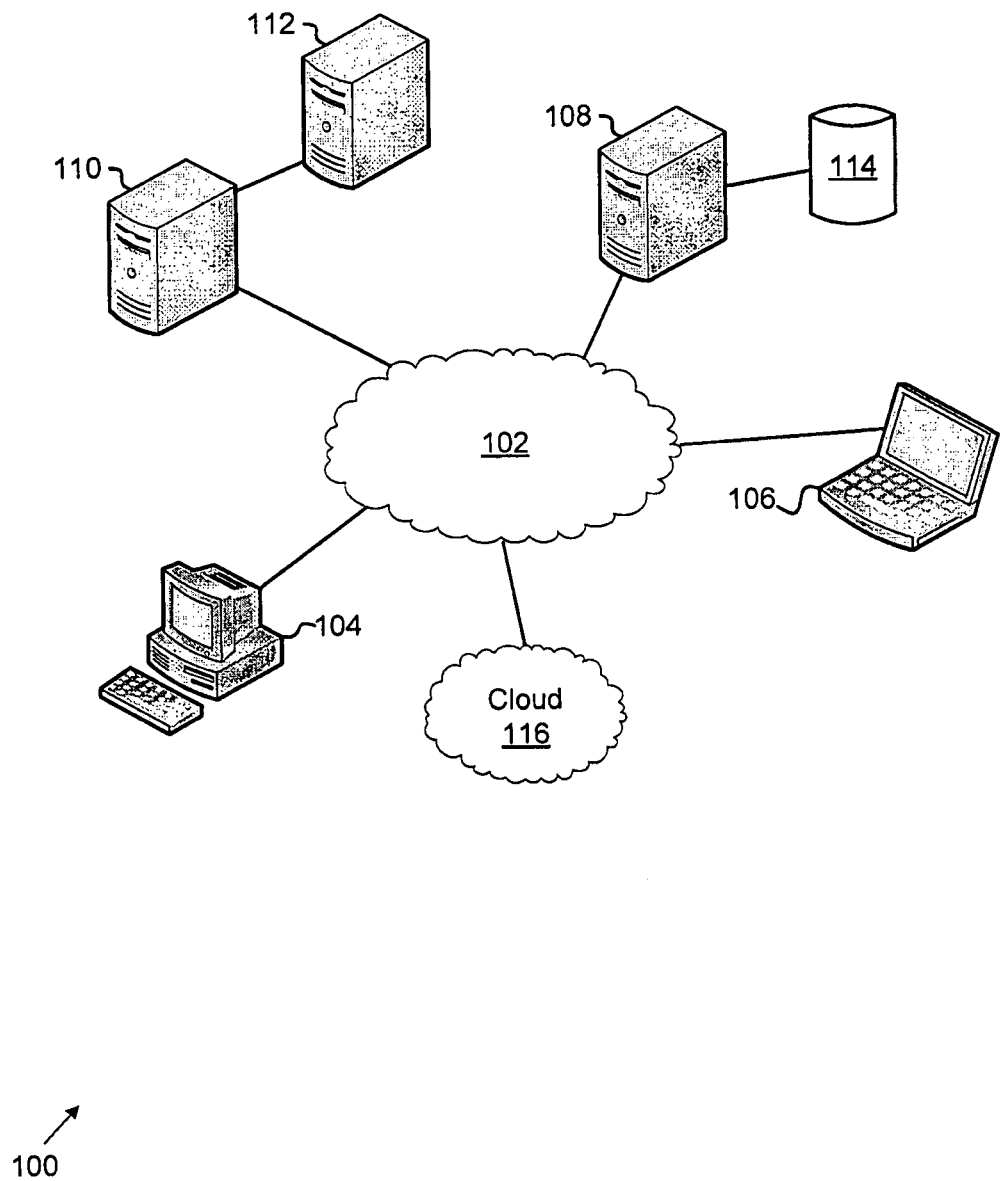
FIG. 1 illustrates an exemplary system for an open application lifecycle management framework.

FIG. 1 illustrates an exemplary system for an open application lifecycle management framework. Here, system 100 includes network 102, clients 104-106, servers 108-112, repository 114, and computing cloud 116. In some examples, the number, type, configuration, and data communication protocols shown may be varied and are not limited to the examples described. As shown here, clients 104-106 and servers 108-112 may be configured to implement, install, or host the described techniques as applications. Data may be stored in database 114, which may be implemented as any type of data storage facility such as a database, data warehouse, data mart, storage area network (SAN), redundant array of independent disks (RAID), or other type of hardware, software, firmware, circuitry, or a combination thereof configured to store, retrieve, organize, access, or perform other operations. Likewise, clients 104-106 and servers 108-112 may be implemented as any type of computing device, hardware, software, firmware, circuitry, or a combination thereof for purposes of providing computational and processing capabilities for the techniques described herein. For example, server 108 may be used with repository 114 to host an application or set of applications that are configured to perform the described techniques for open application lifecycle management using the framework described below. Data associated with any operation may be stored, retrieved, or accessed from repository 114. Still further, computing cloud 116 may be used to provide processing and/or storage resources beyond those provided by server 108 or a cluster of servers (e.g., servers 110-112) in order to install, implement, or otherwise run program instructions for the described techniques. As described, the techniques for open application lifecycle management may be implemented as a standalone application on any of clients 104-106 or servers 108-112. In some examples, if a database management system (i.e., DBMS; not shown) is used with repository 114, the described techniques may also be implemented as an application stored therein.

As shown, clients 104-106, servers 108-112, computing cloud 116, and/or a combination thereof may also be used to implement the described techniques as a distributed application. Different techniques may be used to implemented the described techniques as a distributed application, including deployment as software-as-a-service (i.e., SaaS) or as a distributed application in accordance with specifications such as WSDL (i.e., web services distributed language). Other specifications, protocols, formats, or architectures may be used to implement the described techniques, without limitation, and are not limited to the examples shown and described. Further, system 100 and the above-described elements may be varied and are not limited to those shown and described.

Figure 2A:
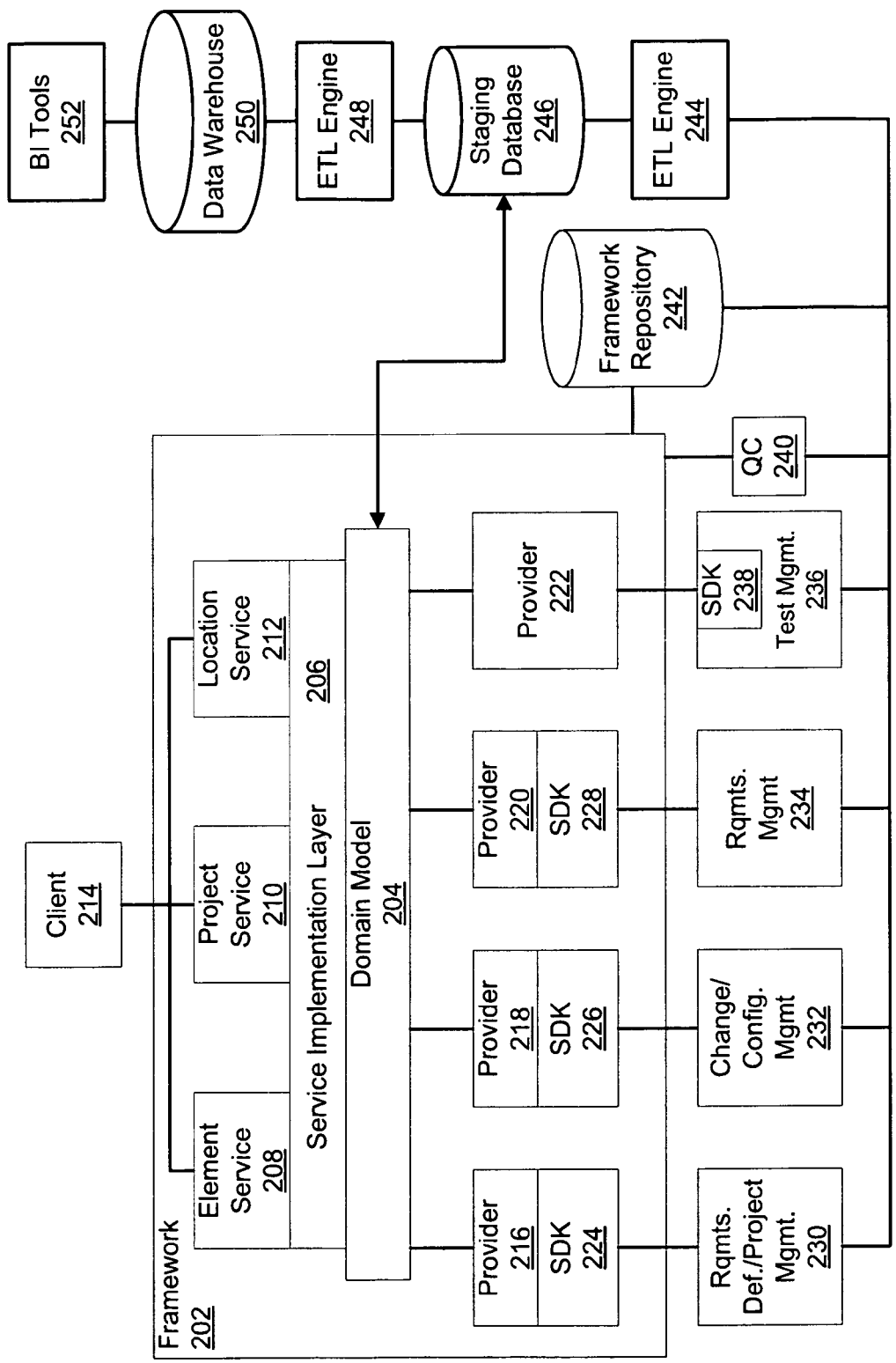
FIG. 2A illustrates an exemplary open application lifecycle management framework.

FIG. 2A illustrates an exemplary open application lifecycle management framework. Here, framework 202 includes domain model 204, service implementation layer 206, services 208-212, client 214, providers 216-222, software development kits (hereafter "SDK") 224-228, applications 230-236, SDK 238, third party application 240, framework repository 242, extract, transform, and load (hereafter "ETL") engine 244, staging database 246, ETL engine 248, data warehouse 250, and business intelligence tools 252. The number, type, configuration, and other aspects of framework 202 and the elements shown are provided for purposes of illustration and may be varied without limitation to the examples shown and described. In some examples, framework 202 may be used to provide a comprehensive structure for implementing application lifecycle management (hereafter "ALM") that provides for comprehensive application development tools and programs including requirements and definition management (hereafter "RDM"), software configuration or control management (hereafter "SCM"), lifecycle quality management (e.g., testing; hereafter referred to as "LQM"), overall project and portfolio management (hereafter "PPM"), test management, quality control (hereafter "QC"), and others, without limitation. In some examples, framework 202 may be configured for use with one or more applications, some of which may be "written" (i.e., developed) using programming and formatting languages, protocols, and specifications that are native to framework 202. In other examples, third party applications that are developed by software developers and development firms that develop software other than framework 202 may be used. For example, applications 236 or 240 may be third party applications that provide test management and quality control features or functionality to framework 202. Any of applications 230-240, and others not shown, may be provided by third parties or organically developed for native implementation (i.e., developed to work with framework 202) with framework 202. As described herein, framework 202 provides cross-product reporting and business intelligence features (as provided by BI tools 252) across various applications, regardless of the type, syntax, format, class, or other attributes that may be unique or proprietary to a given application. In other words, framework 202 enables normalization of data across disparate applications (e.g., applications 230-240) using a common model (e.g., domain model 204) that guides the generation of common data representations for similar data types. For example, data types may be referred to as "elements" or "artifacts," which are used to describe various types of data that are generated, retrieved, accessed, or otherwise used by framework 202 and applications 230-240. In some examples, elements may be a base class of data types that are used with framework 202 and the described techniques.

In some examples, an element may include artifacts or items referred to as "work" (see FIG. 3A below). In other examples, elements may include other data items apart from artifacts or work. Likewise, artifacts may be referred to as a genus of data items that may include, for example, change requests, requirements, tests, tasks, projects, or others. Each of artifact may be a data construct or structure that, when used by domain model 204 in framework 202, is used to generate a common data representation of an item from applications 230-240. Thus, if data generated by application 230, for example, is sent to framework 202, domain model 204 maps the data to an artifact type used by framework 202. As shown, data may be retrieved from application 230-240 (and others) in various types of formats and types, including XML, VXML, Java, and others, without limitation.

Data, once reduced to a common data representation by one or more of services 208-212 may then be sent to staging database 246 for transformation by extract, transform, and load (hereafter "ETL") engine 248 for eventual storage in data warehouse 250. Any type of ETL engine may be used to convert data for storage in or retrieval from staging database 246 or data warehouse 250 and are not limited to any specific example described herein. In order to translate data for use by framework 202 and for storage, using a common data schema (e.g., star schema) in data warehouse 250, domain model 204 is used to provide a map of common data representations.

Data consumed (i.e., used) by applications 230-240 may also be used by services 208-212. In some examples, element service 208 may be an application or program module that provides a mechanism for retrieving key information associated with artifacts (e.g., information about a set of requirements) from data warehouse 250 or framework repository 242. Links between projects and containers may be configured within framework repository 242, linking a project to a container for a given application and further establishing links between applications in the same or different repositories. Generated links may be propagated to data warehouse 250, thus allowing cross-product and cross-platform reporting because common data representations for data types from different applications have been normalized.

Element service 208 uses a common property model with user-defined arbitrary requirements in order to identify elements that are associated with other elements provided by applications 230-240. As an example, element service 208 is integrated with framework 202 using service implementation layer 206. Further, project service 210 may be an application or program module that provides a mechanism to associate containers in a project, enabling artifacts or other elements to be stored in given containers, which are data structures that group artifacts according to a given context. Still further, location service 212 provides the location of repositories and artifacts stored within them. Application lifecycle management uniform resource indicators (hereafter "ALM URIs") are used to identify artifacts and their location within specific repositories. In some examples, an ALM URI is a unique address that indicates the location or address of an artifact within a repository (e.g., framework repository 242).

In some examples, service implementation layer 206 integrates framework 202 with services 208-212 to provide services (e.g., element service 208, project service 210, location service 212, and others) that may be used to associate common data representations with corresponding data from one or more of applications 230-240. For example, if client 214 is used to generate a report to find change requests associated with a given version of a software development project (hereafter "project"), common data representations generated by domain model 204 may be used to map each artifact from applications 230-240 to an artifact format and syntax used by framework 202. Further, once normalized, data (e.g., artifacts, work, elements, and the like) may be stored in framework repository 242 and obtained through links that identify the location of each element or artifact. As an example, location server 212 may be used by client to specify links to a given project that may be created using project service 210. Upon creation of a project using project service 210 and specifying a location of items associated with the project and to be stored in framework repository 242, element service 208 may be invoked by client 214 to generate common data representations for individual items (e.g., change requests from application 234 are mapped to change requests in framework 202 using domain model 204, and the like).

In some examples, data may also be extracted from applications 230-240 and, when transformed, loaded into data warehouse 250. The extraction, transformation, and loading of data in proprietary or different formats may be performed using common data representations. As an example, historical data may be retrieved from data warehouse 250 to provide a cross-product report for artifacts shared between applications 230-240. Further, historical data can be processed in batch, ad hoc, sequential, automatically, manually, or in other ways.

Applications 230-240 generate data that ETL engine 244 extracts, transforms, and loads into staging database 246. Using a dimensional model (not shown) associated with domain model 204 and data warehouse 250, common data representations are used to store data from applications 230-240 into data warehouse 250. As an example, data stored in data warehouse 250 may be stored, retrieved, or otherwise accessed using formats (i.e., syntax) associated with ALM URIs. In some examples, an ALM URI may include a server path, source project path, or other types of paths to objects (i.e., artifacts, elements, items, containers, folders, and the like) within a given repository. In other examples, an ALM URI may also include a schema, authority (source project), path (source element path), query (version), fragment, or other attribute and is not limited to those set forth above. In still other examples, ALM URIs may be structured based upon specification such as RFC 2396, RFC 3305, or others that are used to define URIs. An exemplary format may follow the general schema:

Scheme://<authority>/<path>/?query #fragment
or
ALM://<source project>/<source element path>/?version As an example, an ALM URI used with framework 202 to access, in data warehouse 250, a given artifact (e.g., a requirement associated with an application configured to provide software configuration and change management (e.g., application 232)) may be:

ALM://starteam!78G342G/||; ns=project; 37; ns=view; 123; ns=requirement

In other examples, the above-described schemas and ALM URIs may be varied and are not limited to the structure, syntax, format, or other attributes shown and described.

As shown, providers 216-222 may be used to provide application programming interfaces (hereafter "APIs") with applications 230-240 in order to retrieve data into framework 202. In some examples, providers may be individual programs or interfaces that are written using SDKs 224-228 and 238 that may include tools, utilities, widgets, APIs, or other data, information, or applications that enable integration with, for example, applications 230-240. Proprietary standards, structures, interfaces, protocols, or formats associated with applications 230-240 may be adapted to framework 202 using providers 216-222 and SDKs 228-238. Providers 216-222 may be configured to identify and interpret ALM URIS, which may also be defined by location service 212. Further, providers 216-222 may be used to map SDKs 224-228 and 238 to applications 230-240 and, subsequently framework 202.

Also shown are ETL engines 244 and 248 that are configured to extract data from applications 230-240 or framework 202, respectively. In some examples, each of providers 216-222 has an ETL engine to put data into staging database 246, which organizes data using a dimensional model, which is a model of hierarchical relationship that may be similar to those described using domain model 204. Domain model 204 and a dimensional model (not shown) used for staging database 246 or data warehouse 250 may be implemented as a meta model for generating data structures that organize stored data among containers, folders, elements (e.g., artifacts such as change requests, requirements, tasks, or others)), or the like.

Once extracted, data may be transformed by ETL engines 244 and 248 for loading into staging database 246 or data warehouse 250. Data may be loaded from framework 202 using domain model 204. Data is stored in staging database 246 using data schemas and common data representations generated by domain model 204 and a separate ETL engine is not required for data stored, retrieved, or otherwise accessed by framework 202. Alternatively, data from applications 230-240 may be in a proprietary format, standard, protocol, or syntax and ETL engine 244 is used to ensure that data stored, retrieved, or otherwise accessed from staging database 246 is in a common data representation format established by domain model 204 (i.e., framework 202). Once data is retrieved from staging database 246, ETL engine 248 processes the data for storage, retrieval, or other operations associated with data warehouse 250, which may use other types of data schema (e.g., star schema, and others, without limitation). Once stored in data warehouse 250, BI tools module 252 may be used to evaluate and analyze data used by framework 202 or applications 230-240, generating reports using common data representations associated with artifacts, regardless of proprietary data formats or types. For example, an artifact such as a change request may be used as the basis for generating a report using BI tools module 252 for all applications. Using framework 202 and domain model 204, BI tools module 252 may generate a report showing all change requests for a given project that are stored in data warehouse 250. In other examples, framework 202 and the above-described elements may be varied and are not limited in function, structure, operation, configuration, or other aspects to those descriptions provided.

Figure 2B:
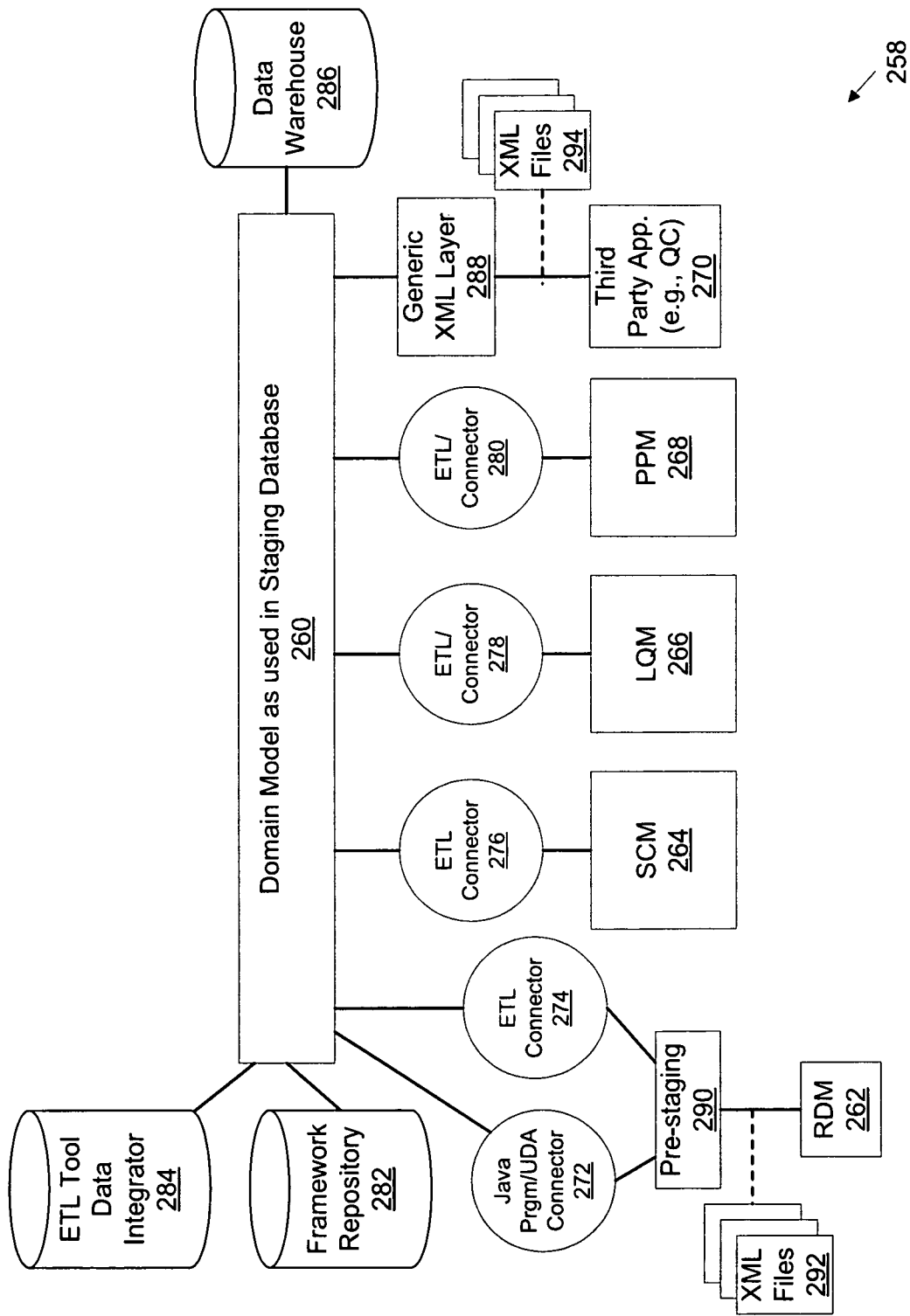
FIG. 2B illustrates another exemplary open application lifecycle management framework.

FIG. 2B illustrates another exemplary open application lifecycle management framework. Here, framework 258 includes domain model 260, applications 262-270, connectors 272-280, framework repository 282, ETL tool data integrator 284, data warehouse 286, generic XML layer 288, pre-staging process, and XML files 292-294. As described above, different types of applications may be provided (e.g., RDM, SCM, LQM, PPM, QC, and others). One or more of applications 262-270 may be third-party applications developed by an organization, party, business, or other entity that is different than the one that provided framework 258. In other words, applications 262-270 may be considered as sources of data that use different data representations. Domain model 260 may be used to generate common representations for data generated by applications 262-270. In some examples, data may be retrieved from applications 262-270 using connectors 272-288. In other examples, data may be retrieved from some applications using a generic XML layer that, when data from application 270 is retrieved, is converted into XML files that are loaded into generic XML layer 288 before being loaded into domain model 260.

As an example, when data is retrieved from some applications such as application 262, a pre-staging data model, process, or database (e.g., pre-staging process 290) is used to convert data from application 262 into XML files 292. Once converted, XML files 292 are loaded into pre-staging database 290 and, subsequently, data is transformed from XML files are loaded into domain model 260 using connectors 272-274 into ETL tool data integrator 284. In some examples, pre-staging process 290 may be used to detect changes in data generated from application 262 in order to capture incremental updates or changes to provide rapid updates for reporting or other purposes. In other examples, changes detected may be provided from pre-staging process 290 to domain model 260, framework repository 282, ETL tool data integrator 284, data warehouse 286, or other applications or processes beyond those shown and described. As described herein, connectors 272-280 may be implemented as a Java program and an ETL engine that is configured to extract data from applications 262-270, transformed into a desirable format, and loaded into domain model 260, ETL tool data integrator 284, framework repository 282, or data warehouse 286. In other words, a connector may be a source (i.e., application)-specific module that is configured to extract data from a given application using user defined attributes (hereafter "UDAs"). Connectors 272-280 may also provide input to a staging database (not shown) that is built around domain model 260. As used herein, data from applications 262-270 may be processed to identify UDAs based on a common definition or a set of common fields or attributes (e.g., name, type, value). As some applications may not be configured to readily identify user defined attributes, generic XML (i.e., eXtensible Markup Language) layer 288 may be used to integrate a third party application with domain model 260. For example, third party application 270 may be a quality control (QC) application that is not configured to readily identify data types, elements, or artifacts in data being generated by it. However, by converting data transferred from the third party application into XML files 294, generic XML layer 288 may be used to handle and transform the data for use by domain model 260 when determining which repository to use for storing the data. In other examples, data retrieved by ETL engines integrated with connectors 272-280 may also be transformed using domain model 260 and loaded into data warehouse 286. Still further, data may be organized and stored in framework repository 282 or ETL tool data integrator 284 and used for various purposes, including by any of applications 262-270 (or others), generating reports by ETL tool data integrator 284, stored in framework repository 282 for use by domain model 260 or client 214 (FIG. 2A), or other uses not described herein. In other examples, framework 258 and the above-described elements may be varied in function, structure, configuration, implementation, or other aspects and is not intended to be limited to the descriptions provided.

Figure 3A:
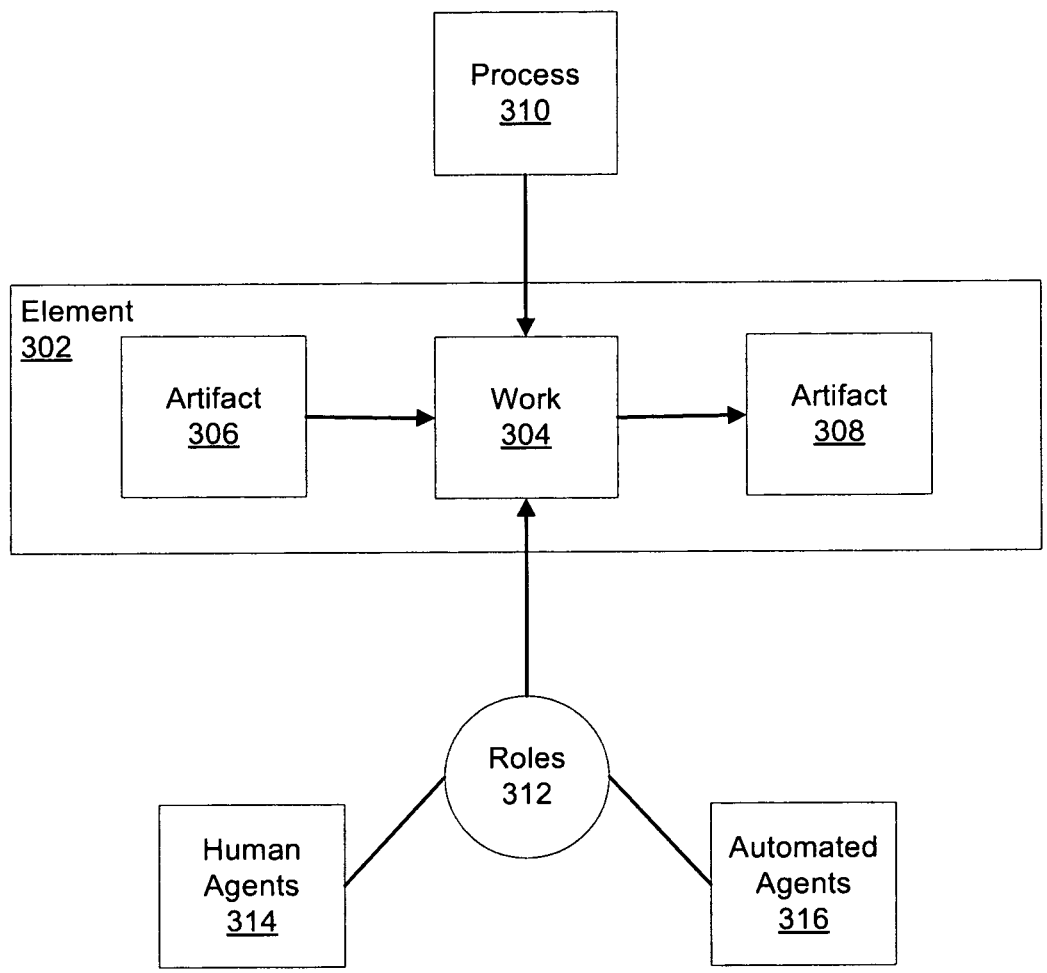
FIG. 3A illustrates an exemplary open application lifecycle management meta model.

FIG. 3A illustrates an exemplary open application lifecycle management meta model. Here, meta model 300 includes element 302, work 304, artifacts 306-308, roles 312, human agents 314, and automated agents 316. Also shown, but not part of meta model 300 is process 310. As shown, meta model 300 describes relationships between process 310, element 302 (and different types of elements (e.g., artifacts 306-308 vs. work 304), and roles 312. In some examples, process 310 may be used to indicate a project (e.g., work 304) that involves various types of artifacts (e.g., artifacts 306-308). Artifacts are described in greater detail below in connection with FIG. 3B.

Referring back to FIG. 4A, data that is stored and organized as work 304 or artifacts 306-308 may be generated from roles in an organization. For example, human agents 314 represents data input by a user, such as a business analyst, system administrator, or the like. Automated agents 316 may be software or program code that are configured to identify data into various types of elements (e.g., work 304 vs. artifacts 306-308). In other examples, meta model 300 may be varied and different data types, inputs, and relationships may be shown and are not limited to those provided and described.

Figure 3B:
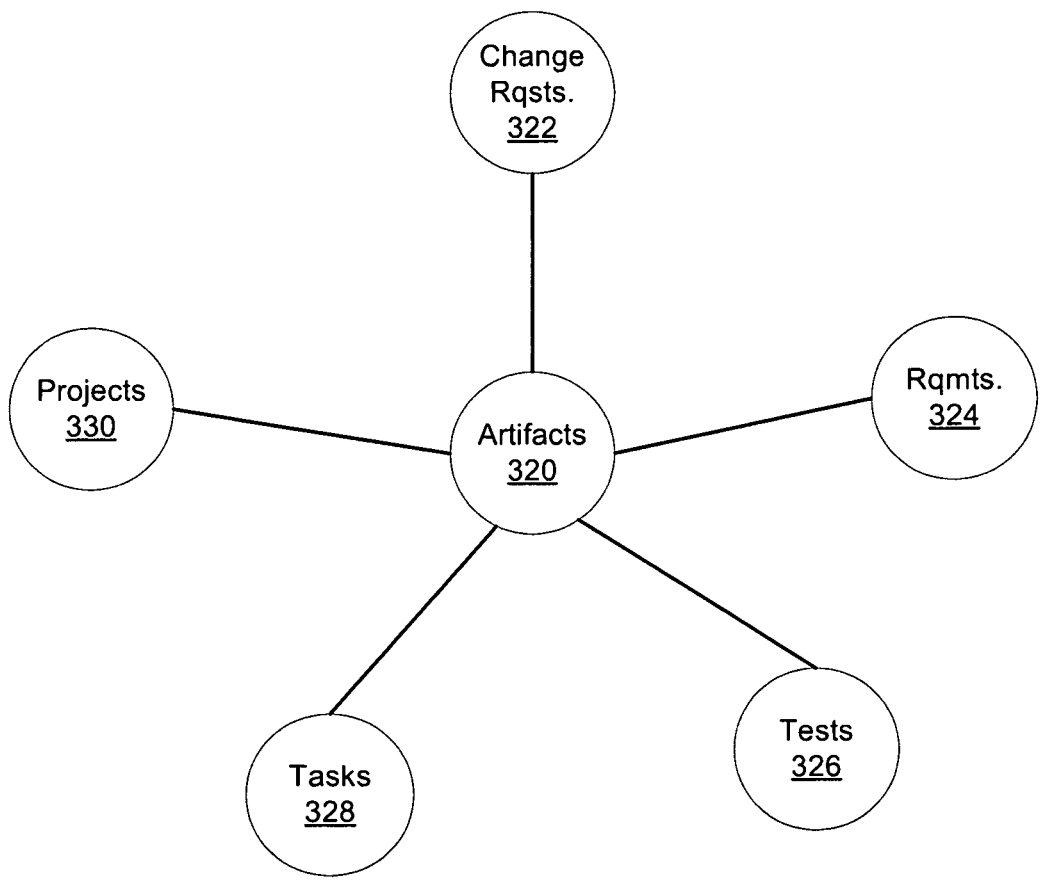
FIG. 3B illustrates exemplary artifacts used in an open application lifecycle management framework.

FIG. 3B illustrates exemplary artifacts used in an open application lifecycle management framework. Here, artifacts 320 may include change requests 322, requirements 324, tests 326, tasks 328, and projects 330, all of which may be described generally as "artifacts." In some examples, more, fewer, or different artifacts may be used and are not limited to those shown and described. As an example, framework 202 (FIG. 2A) may be configured to organize data according to domain model 204 (FIG. 2A), identifying, classifying, or otherwise sorting data into classes of artifacts. For example, change requests 322 may be caused by changes that occur when an application (e.g., applications 230-240 (FIG. 2A)) is running. Comparing a previously stored data set to a current data set or, for increasing computational efficiency, monitoring changes in data may be classified as change requests 322. When changes occur, they may be propagated across various repositories and products, despite having different addresses, protocols, formats, syntax, or the like. Likewise requirements 324 may be input that identifies a given feature, function, or operation that an application is to perform. By classifying requirements as an artifact using a domain model (e.g., domain model 204 (FIG. 2A)), reports may be run to determine how many requirements exist, outstanding requirements, requirements sources, or other information using tools such as BI tools 252 (FIG. 2A)).

Hierarchically, artifacts may also be organized based on a relationship to a given project. Projects 330 may be an artifact that allows data to be organized based on a given information technology (hereafter "IT") software development project. Other artifacts (e.g., change requests 322, requirements 324, tests 326, tasks 328, and others) may be associated with projects 330 and used to organize data, for example, in framework repository 242. In some examples, tests 326 may be artifacts that describe tests or testing activities that are performed against a given project. Likewise, tasks 328 may be open or closed activities to be performed by designated personnel, users, or clients in association with a given project. In other examples, the above-described artifacts may be varied and are not limited to the artifacts and relationships provided.

Figure 4:
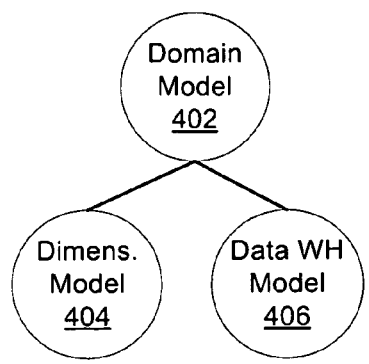
FIG. 4 illustrates exemplary domain models used in an open application lifecycle management framework.

FIG. 4 illustrates exemplary domain models used in an open application lifecycle management framework. Here, domain model 402 may be used to generate related data models that are used for different purposes. For example, dimensional model 404 may be used to establish projects, links, relationships, or other aspects associated with, for example, staging database 246 (FIG. 2A). Likewise, data warehouse model 406 may be a data model that is used to organize, normalize, or otherwise manipulate data for storage in data warehouse 250 (FIG. 2A). In other examples, different types of data models may be used or created for use with framework 202 (FIG. 2A) and are not limited to the examples shown and described.

Figure 5:
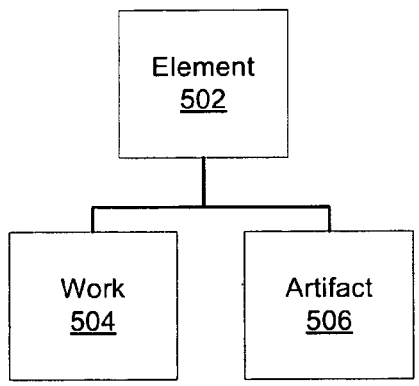
FIG. 5 illustrates exemplary elements used in an open application lifecycle management framework and domain model.

FIG. 5 illustrates exemplary elements used in an open application lifecycle management framework and domain model. Here, element 502 may be described as include two types of elements, including work 504 and artifact 506. Artifact 506 may be source code or items that are generated as a result of on-going software development processes (e.g., during a build). Similarly, work 504 may be a type of element that describes projects being worked upon by software developers using, for example, framework 202 (FIG. 2A). In other examples, element 502 may include fewer, more, or different data types apart from those shown and described.

Figure 6:
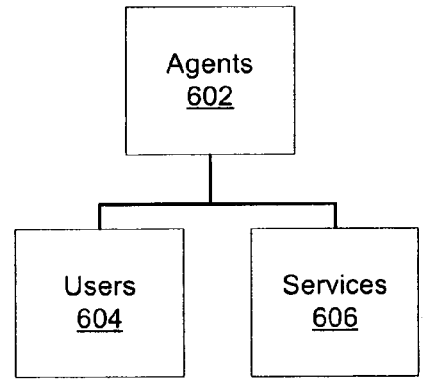
FIG. 6 illustrates exemplary agents used in an open application lifecycle management framework and domain model.

FIG. 6 illustrates exemplary agents used in an open application lifecycle management framework and domain model. Here, agents 602 may be classified as two different types of data inputs, users 604 and services 606. Agents 602 may describe various types of inputs that provide data associated with work projects. For example, users 604 may provide input (e.g., human agents 314 (FIG. 3A)) as well as services 606 (e.g., automated agents 316 (FIG. 3A)) that, when executed, generate data that may be classified as being produced by agents 602. In other examples, different types of agents may be used as part of domain model 204 (FIG. 2A) and are not limited to those shown and described.

FIG. 7 illustrates exemplary work types used in an open application lifecycle management framework and domain model. Here, work 702 includes data associated with tasks 704 and projects 706. In some examples, projects 706 are a type of work object (i.e., work 702) and may be identified as a type of container created within data warehouse 250 or framework repository 242. Likewise, tasks 704 may be types of work data that are associated with projects 706. In other examples, work 702 may be classified differently in domain model 204 (FIG. 2A) and are not limited to the examples shown and described.

FIG. 8 illustrates exemplary artifacts used in an open application lifecycle management framework and domain model. Here, artifacts 802 include requirements 804, change requests 806, and tests 808. In some examples, artifacts 802 may be generated during a software development project (i.e., project 706) and indicate a specific function to be performed in a given project context. In some examples, a project context may refer to the surrounding conditions, aspects, attributes, or other characteristics that are used to define an individual software project. For example, part of a project context may include the type of software development methodology being used. As an example, software development methodologies may include waterfall, agile, iterative, or others, without limitation. Thus, requirements 804 indicate a type of artifact that is used to indicate a functional requirement for the project. Change requests 806 may indicate changes in features or functions for the project that are provided and propagated across various products (e.g., applications 262-270 (FIG. 2B)) to ensure cross-product integration and reporting. Subsequently, tests 808 may be tests that are run for purposes of quality control or testing purposes to ensure software development projects are tested to fulfill requirements that have been specified (i.e., requirements 804). In other examples, other types of artifacts may be classified as a species of artifact 802 and are not limited to those shown and described.

FIG. 9 illustrates exemplary elements used in an open application lifecycle management framework and domain model. Here, element 902 may include attribute 904, attribute meta data 906, and element metadata 908. As used herein, element 902 may include work 702 (FIG. 7) and artifacts 802 (FIG. 8). In some examples, element 902 refers to a base class that is used with domain model 204 (FIG. 2A). Attribute 904 may be used to describe data associated with a given element to identify a name, type, path, or other characteristic of a given element. Examples of attributes may include names, ALM URI, description, or others. Metadata that is used to describe the attribute, including a value (e.g., numerical, quantitative, qualitative) or indicator (e.g., binary) is attribute metadata 906. Attribute metadata 906 provide additional descriptive indicators such as a default value, a given length, a type of possible values, whether the attribute is required, and others. Likewise, element metadata 908 may be used to describe an element, such as source (i.e., application)-specific UDAs. In other examples, elements 902, attribute 904, attribute metadata 906, and element metadata 908 may be defined or described differently and are not limited to the examples shown and described.

Figure 10:
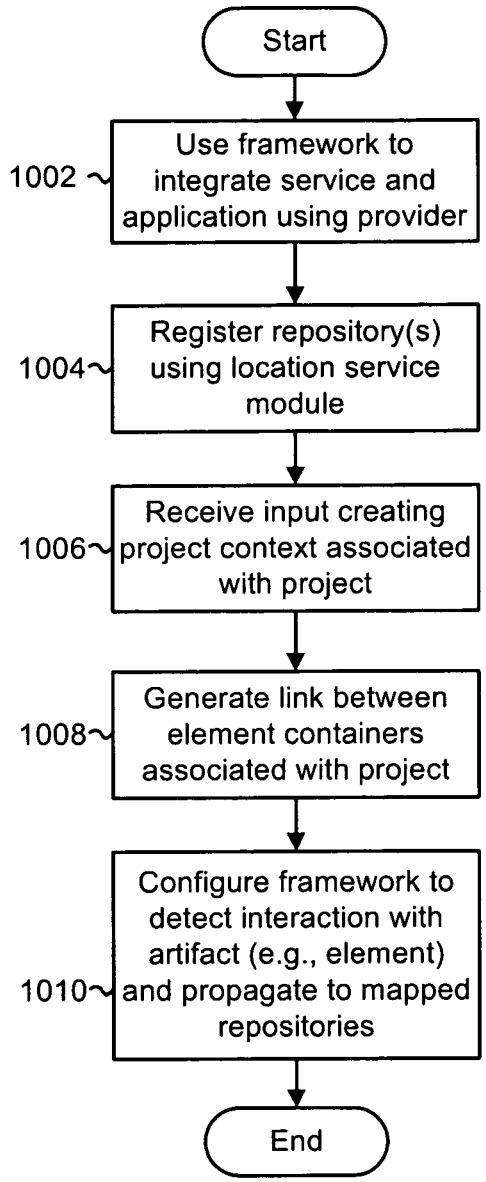
FIG. 10 illustrates an exemplary process for an open application lifecycle management framework.

FIG. 10 illustrates an exemplary process for an open application lifecycle management framework. Here, framework 202 (FIG. 2A) is used to integrate a service and an application using a provider (1002). One or more repositories associated with an application (i.e., an application may be using multiple repositories) are registered using location service 212 (FIG. 2A). After registering repositories with framework 202, an input is received that indicates the creation of a project context associated with a given software development project (1006). After creating a project context, one or more links between element (i.e., work 702 (FIG. 7), artifacts 802 (FIG. 8)) containers created within framework repository 242 (FIG. 2A), data warehouse 250 (FIG. 2A), or other repositories are generated (1008). Framework 202 is then configured to detect interaction with artifacts that are then propagated to repositories that were previously registered (1010). In other examples, the above-described process may be varied in function, order, operation, or other aspects, without limitation to the descriptions provided.

Figure 11:
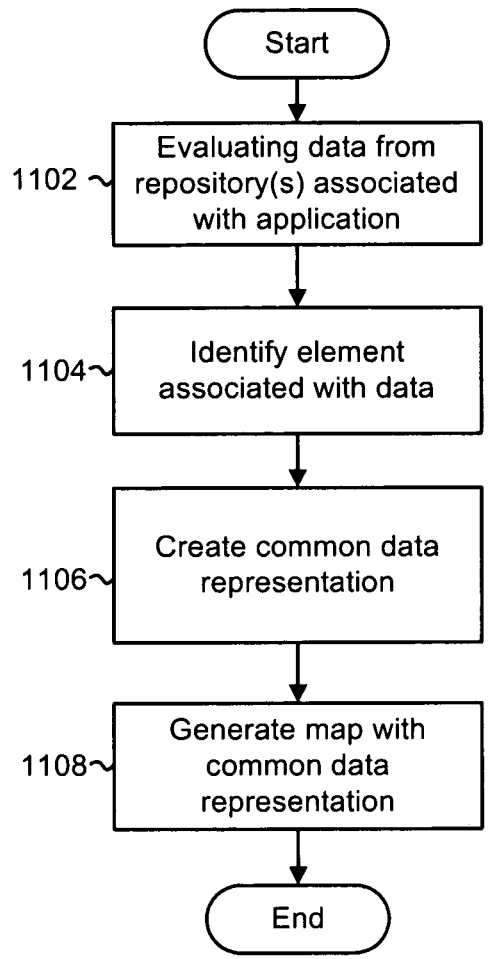
FIG. 11 illustrates an exemplary process for an open application lifecycle management domain model.

FIG. 11 illustrates an exemplary process for an open application lifecycle management domain model. Here, data received from a repository is evaluated to identify elements, agents, attributes, syntax, or other aspects (1102). Once evaluated, elements associated with the evaluated data are identified (1104) and used to create common data representations to artifacts associated with a given project (1106). Common data representations are then used to map artifacts associated with a framework to data formats, syntax, element structures, attributes, or other features associated with data from applications integrated with framework 202 (FIG. 2A) using, for example, providers 216-222 (FIG. 2A) and/or connectors 272-280 (1108). In other examples, the above-described process may be varied in function, order, operation, or other aspects, without limitation to the descriptions provided.

Figure 12:
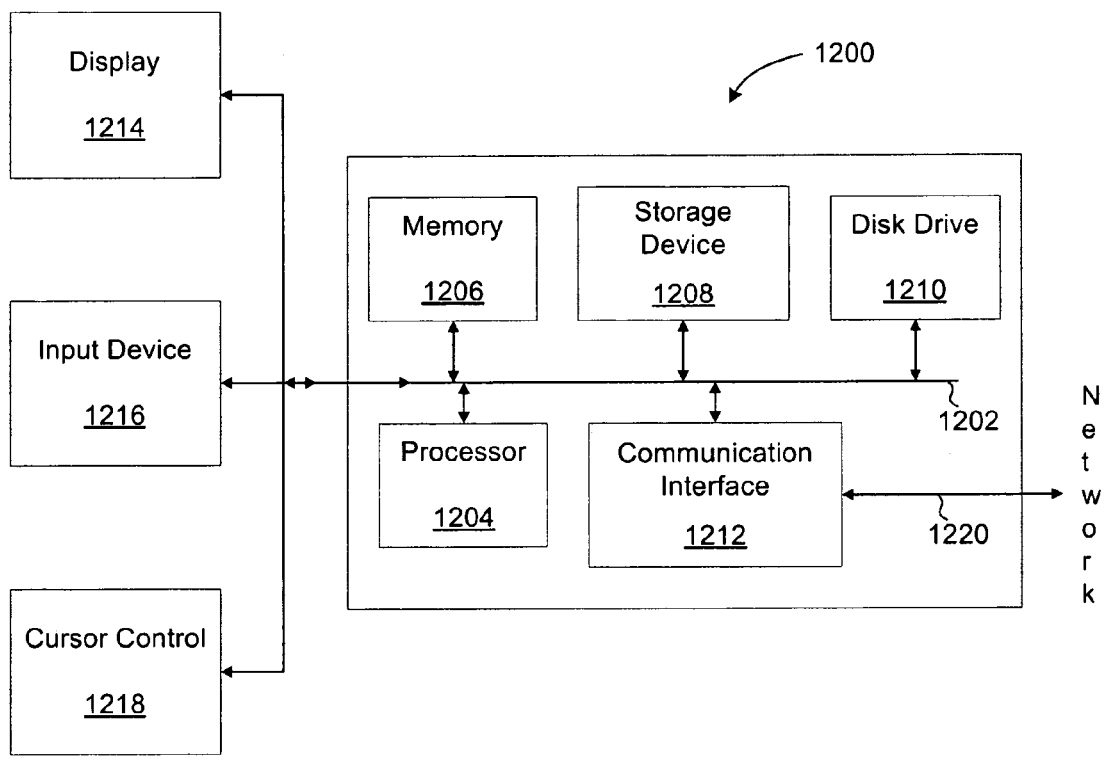
FIG. 12 illustrates an exemplary computer system suitable for requirements definition using interactive prototyping.

FIG. 12 illustrates an exemplary computer system suitable for requirements definition using interactive prototyping. In some examples, computer system 1200 may be used to implement computer programs, applications, methods, processes, or other software to perform the above-described techniques. Computer system 1200 includes a bus 1202 or other communication mechanism for communicating information, which interconnects subsystems and devices, such as processor 1204, system memory 1206 (e.g., RAM), storage device 1208 (e.g., ROM), disk drive 1210 (e.g., magnetic or optical), communication interface 1212 (e.g., modem or Ethernet card), display 1214 (e.g., CRT or LCD), input device 1216 (e.g., keyboard), and cursor control 1218 (e.g., mouse or trackball).

According to some examples, computer system 1200 performs specific operations by processor 1204 executing one or more sequences of one or more instructions stored in system memory 1206. Such instructions may be read into system memory 1206 from another computer readable medium, such as static storage device 1208 or disk drive 1210. In some examples, hard-wired circuitry may be used in place of or in combination with software instructions for implementation.

The term "computer readable medium" refers to any tangible medium that participates in providing instructions to processor 1204 for execution. Such a medium may take many forms, including but not limited to, non-volatile media and volatile media. Non-volatile media includes, for example, optical or magnetic disks, such as disk drive 1210. Volatile media includes dynamic memory, such as system memory 1206.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1202 for transmitting a computer data signal.

In some examples, execution of the sequences of instructions may be performed by a single computer system 1200. According to some examples, two or more computer systems 1200 coupled by communication link 1220 (e.g., LAN, PSTN, or wireless network) may perform the sequence of instructions in coordination with one another. Computer system 1200 may transmit and receive messages, data, and instructions, including program, i.e., application code, through communication link 1220 and communication interface 1212. Received program code may be executed by processor 1204 as it is received, and/or stored in disk drive 1210, or other non-volatile storage for later execution.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method, comprising:
integrating, using an application lifestyle management framework targeting complex software development that is hosted on one or more computers and having one or more interchangeable services, the one or more services with one or more interchangeable applications using one or more providers, wherein each of the one or more providers is adapted to at least one of the one or more applications;
registering one or more repositories associated with the one or more applications using a location service module;
receiving an input creating a project context associated with a project, data associated with the input being stored in a data structure associated with the project, the data structure being stored in a repository associated with the framework;
generating a link, after registering the one or more repositories, between one or more element containers associated with the project, the link and the one or more element containers being stored in the repository; and
configuring the framework to detect another input indicating interaction with an artifact, other data associated with the interaction being mapped between the one or more repositories and the repository using a domain model.

2. The method of claim 1, wherein each of the one or more providers is an application programming interface of the framework.

3. The method of claim 1, wherein the framework is an application.

4. The method of claim 1, wherein the framework is an open application lifecycle management application.

5. The method of claim 1, wherein the one or more applications are implemented on one or more other computers that are in data communication with the framework.

6. The method of claim 1, wherein at least one of the one or more services comprises an element service.

7. The method of claim 1, wherein at least one of the one or more services comprises a project service.

8. The method of claim 1, wherein at least one of the one or more services comprises a notification service.

9. The method of claim 1, wherein at least one of the one or more services comprises a security service.

10. The method of claim 1, wherein at least one of the one or more services comprises a user management service.

11. The method of claim 1, wherein at least one of the one or more services comprises a search service.

12. The method of claim 1, wherein at least one of the one or more services comprises a tray service.

13. The method of claim 1, wherein the framework further comprises a service implementation layer configured to provide run-time integration of data provided by a client.

14. The method of claim 13, wherein a change request associated with the artifact is normalized between the one or more repositories and the repository, the change request being configured to display using any of the one or more applications.

15. The method of claim 1, wherein the framework is configured to automatically manage a requirement associated with the artifact and the project using the link between the one or more element containers.

16. A system, comprising:
a database configured to store data associated with an application lifestyle management framework targeting complex software development; and
logic configured to use the framework hosted on one or more computers and having one or more interchangeable services to integrate the one or more services with one or more interchangeable applications using one or more providers, wherein each of the one or more providers is adapted to at least one of the one or more applications, to register one or more repositories associated with the one or more applications using a location service module, to receive an input creating a project context associated with a project, the data associated with the input being stored in a data structure associated with the project, the data structure being stored in a repository associated with the framework, to generate a link, after registering the one or more repositories, between one or more element containers associated with the project, the link and the one or more element containers being stored in the repository, and to configure the framework to detect another input indicating interaction with an artifact, other data associated with the interaction being mapped between the one or more repositories and the repository using a domain model.

17. A system, comprising:
an application lifestyle management framework targeting complex software development comprising an application lifecycle management client in data communication with an interchangeable service, the service being integrated with the framework using a service implementation layer and a domain model, wherein the domain model is used to map data from one or more interchangeable applications to the framework, the data being stored in a repository;
an application in data communication with the framework using one or more providers, wherein the providers adapt the data exchanged between the framework and the applications according to the domain model;
a data warehouse configured to store the data upon extraction from the application or the framework, wherein an extract, transform, and load engine is configured to extract the data; and
an analytical module configured to use the data stored in the data warehouse or the repository, wherein the analytical module is configured to generate a report or business intelligence associated with the data.

18. The system of claim 17, wherein the analytical module is configured to provide historical reports using the business intelligence application.

19. The system of claim 17, wherein the framework is configured to map generated data from the service to the data from the one or more applications using a common data representation generated according to the domain model.

20. A computer program product embodied in a non-transitory computer readable medium and comprising computer instructions for: integrating, using an application lifestyle management framework targeting complex software development that is hosted on one or more computers and having one or more interchangeable services, the one or more services with one or more interchangeable applications using one or more providers, wherein each of the one or more providers is adapted to at least one of the one or more applications; registering one or more repositories associated with the one or more applications using a location service module; receiving an input creating a project context associated with a project, data associated with the input being stored in a data structure associated with the project, the data structure being stored in a repository associated with the framework; generating a link, after registering the one or more repositories, between one or more element containers associated with the project, the link and the one or more element containers being stored in the repository; and configuring the framework to detect another input indicating interaction with an artifact, other data associated with the interaction being mapped between the one or more repositories and the repository using a domain model.

* * * * *